United States Patent [19]

Oberjatzas et al.

[11] Patent Number: 4,930,025
[45] Date of Patent: May 29, 1990

[54] ARRANGEMENT FOR INDICATING ANGULAR POSITION OF HEADWHEEL DISK IN A TAPE RECORDER

[75] Inventors: Günter Oberjatzas, Barsinghausen; Heinz-Werner Keesen, Hannover, both of Fed. Rep. of Germany

[73] Assignee: Deutsche Thomson Brandt GmbH, Villingen-Schwenningen, Fed. Rep. of Germany

[21] Appl. No.: 298,203

[22] Filed: Jan. 17, 1989

Related U.S. Application Data

[63] Continuation of Ser. No. 019,079, Feb. 26, 1987, abandoned.

[30] Foreign Application Priority Data

Feb. 26, 1986 [DE] Fed. Rep. of Germany ....... 3606091

[51] Int. Cl.$^5$ .................... G11B 15/14; G11B 21/02
[52] U.S. Cl. ........................ 360/64; 360/70; 360/75
[58] Field of Search ............ 360/75, 77, 70, 10.2, 360/64; 318/437

[56] References Cited

U.S. PATENT DOCUMENTS

| | | | |
|---|---|---|---|
| 3,402,257 | 9/1968 | Lange | 360/70 |
| 3,670,113 | 6/1972 | Bragos | 360/75 |
| 3,801,833 | 4/1974 | Leigeb | 318/254 |
| 3,883,890 | 5/1975 | Tanigowa | 360/70 |
| 3,946,435 | 3/1976 | Langer | 360/70 |
| 4,025,934 | 5/1977 | Hartmann et al. | 324/163 |
| 4,071,856 | 1/1978 | Kihara | 360/70 |
| 4,236,185 | 11/1980 | Obremski | 360/10.2 |
| 4,481,440 | 11/1984 | Muller | 310/268 |

FOREIGN PATENT DOCUMENTS

| | | |
|---|---|---|
| 1915784 | 10/1969 | Fed. Rep. of Germany . |
| 1774502 | 1/1972 | Fed. Rep. of Germany . |
| 3115670 | 11/1982 | Fed. Rep. of Germany . |
| 3430317 | 3/1985 | Fed. Rep. of Germany . |
| 931752 | 8/1961 | United Kingdom . |

OTHER PUBLICATIONS

Rolf Müller, "DIrect Current Motor Without COllctor", Jul. 24, 1980, WO 80/01525.
G. Schmidt, "Semiprofessionelle Video-Recorder III", Funk-Technik 1968, Nr. 23, S.987–900.
Dr. Georg JOOS, "Lehrbuch Der Theoretischen Physik", Leipzig 1954, pp. 278–281.

*Primary Examiner*—Vincent P. Canney
*Attorney, Agent, or Firm*—Spencer & Frank

[57] ABSTRACT

A device for transferring signals between itself and a record carrier tape, the device including a rotating head wheel disk, at least one head disposed on the rotating head wheel disk, a sensor and a signal emitter to indicate the position of the head wheel disk, the improvement wherein the signal emitter comprises two juxtaposed electrical conductors.

12 Claims, 3 Drawing Sheets

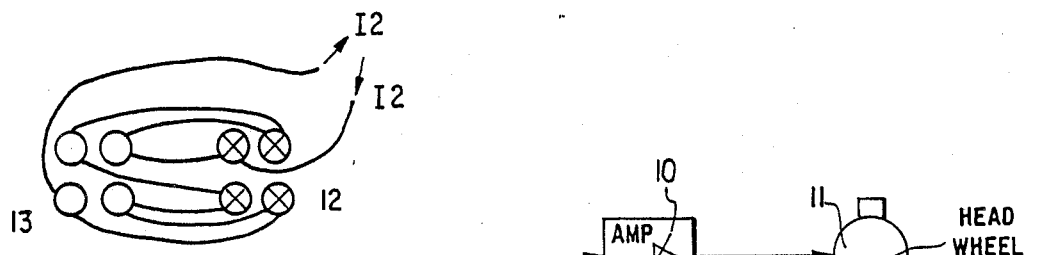
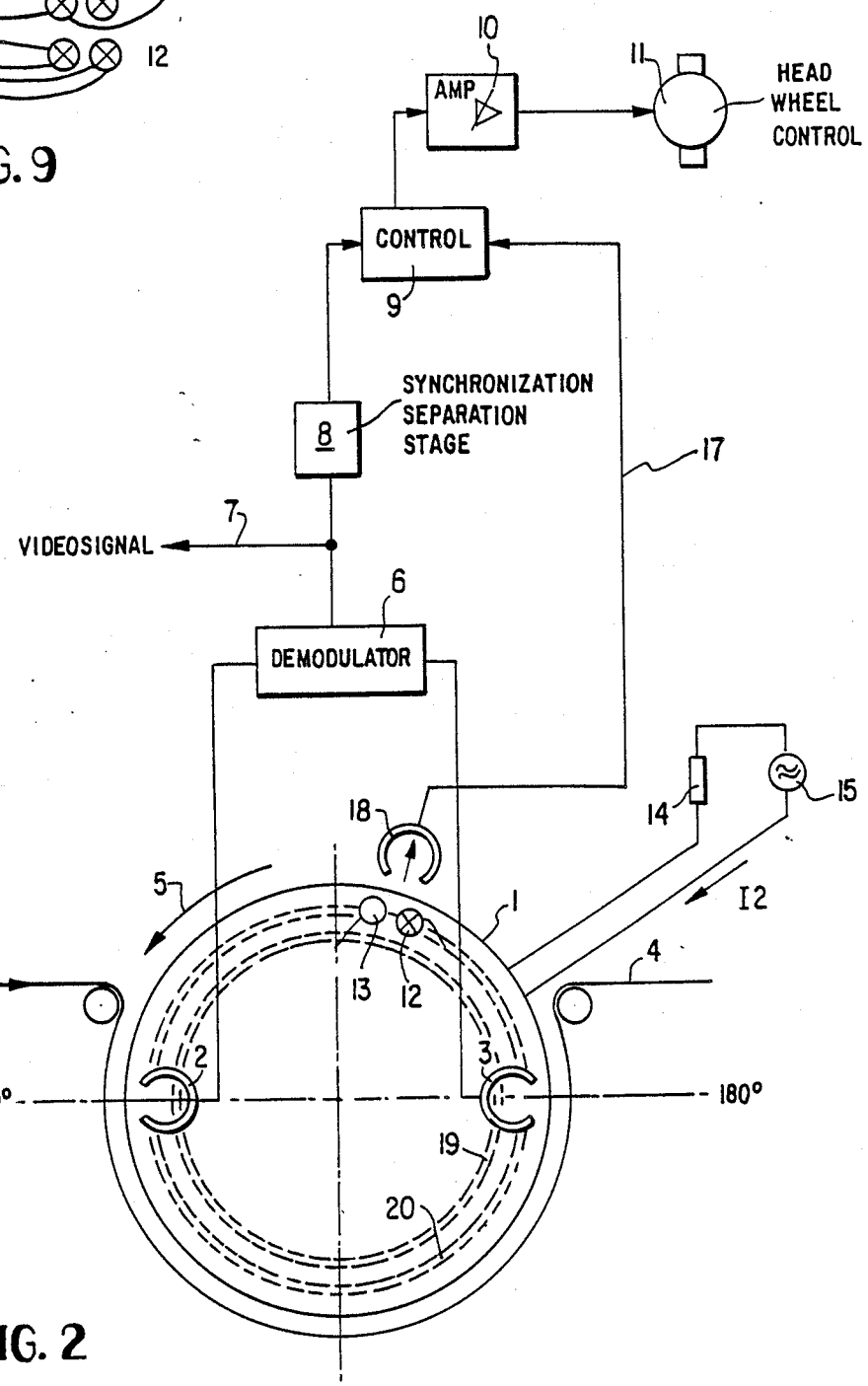
FIG. 9
FIG. 2

ARRANGEMENT FOR INDICATING ANGULAR POSITION OF HEADWHEEL DISK IN A TAPE RECORDER

This application is a continuation of application Ser. No. 07/019,019, filed Feb. 26, 1987, now abandoned.

BACKGROUND OF THE INVENTION

The present invention relates to a device, particularly a video recorder, for playing back and/or recording signals on or from a record carrier tape, and particularly for a digital signal on a magnetic tape, wherein the device includes a rotating head wheel disk carrying at least one head thereon, a sensor and a signal emitter to indicate the angular position of the head wheel disk.

German Offenlegungsscrift [laid-open patent application] No. 3,115,670 discloses a method of determining the angular position of magnetic heads with respect to a tape. In addition to the two rotating magnetic heads, the head wheel disk includes two rotating permanent magnets which produce pulses of alternating polarity during rotation in a stationary head or in a stationary coil outside the head, fixed in the vicinity of the head wheel. The pulses serve as a criterion for the respective position and velocity of the head wheel disk (see page 6, first paragraph of the above cited German Offenlegungsschrift).

SUMMARY OF THE INVENTION

It is an object of the present invention to provide an arrangement which improves the indication of the angular position of the head wheel disk.

The above and other objects are accomplished according to the invention in the context of a device as first described above, wherein the signal emitter is comprised of two juxtaposed electrical conductors.

BRIEF DESCRIPTION OF THE DRAWINGS

For a better understanding of the invention, embodiments thereof will be described below with reference to drawing figures, wherein:

FIG. 2 is a schematic showing a signal emitter on a head wheel disk according to another embodiment of the invention.

FIG. 9 is a diagram which shows a further arrangement of conductors according to the invention.

DESCRIPTION OF THE PREFERRED EMBODIMENTS

Figure 1:
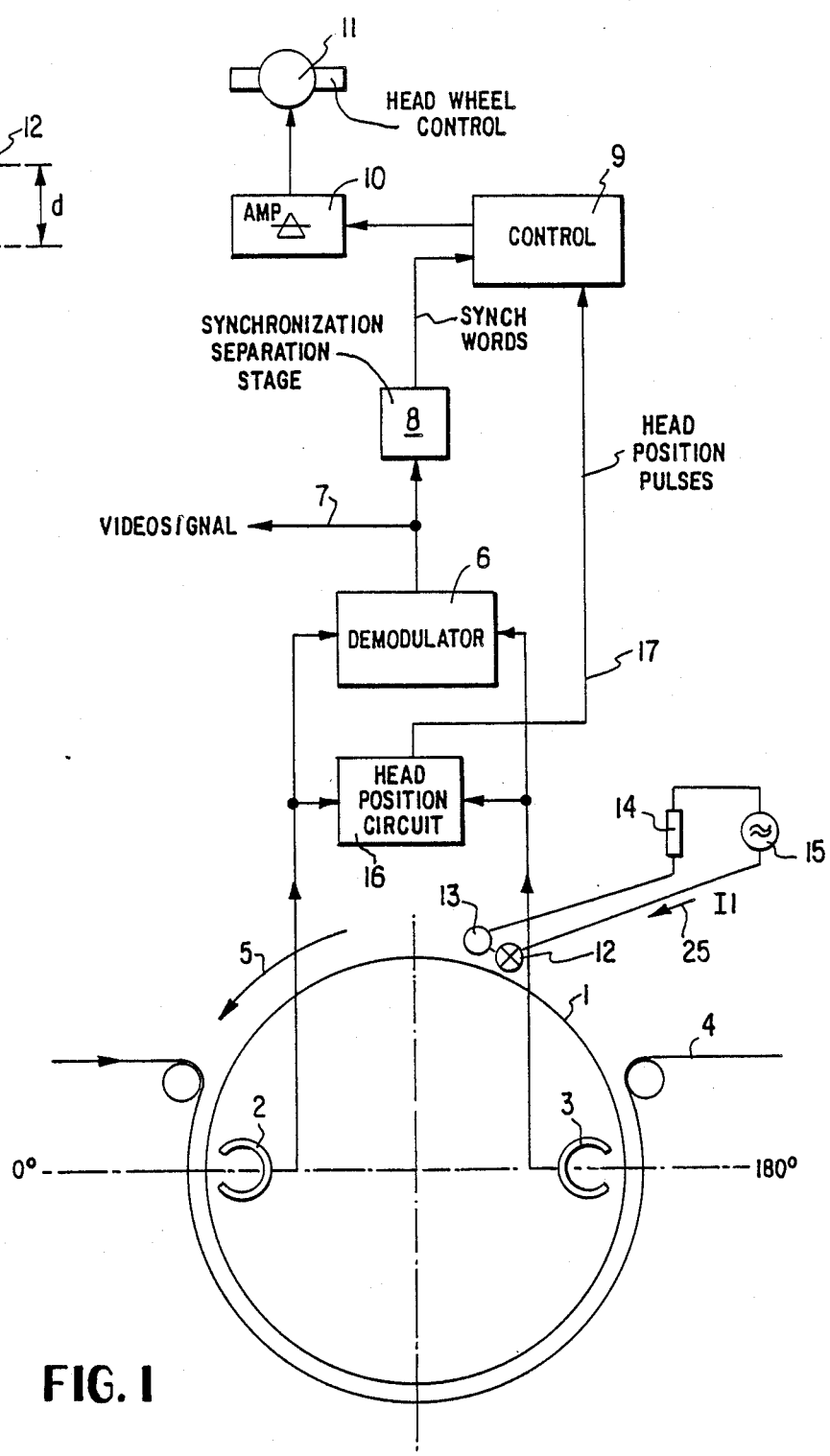
FIG. 1 is a schematic showing a signal emitter at a head wheel disk according to one embodiment of the invention.

FIG. 1 shows a head wheel disk or a head drum 1, hereinafter called head wheel, equipped with two magnetic heads 2 and 3. A magnetic tape 4 is placed around head wheel 1. Head wheel 1 rotates in the direction of arrow 5. Fields in magnetic tape 4 induce voltages in magnetic heads 2 and 3. These voltages are fed through lines to a demodulator 6. Demodulator 6 demodulates the signals coming from magnetic tape 4 and feeds demodulated signals to an output 7 at which a video signal can be picked up. In a synchronization separation stage 8, synchronizing words, hereinafter called sync words, are filtered out. These sync words are fed to a control 9 which regulates a head wheel control 11 via an amplifier 10.

Two conductors 12 and 13 are arranged parallel to the axis of rotation of head wheel 1. Conductors 12 and 13 are fixed in the chassis of the video recorder, in the vicinity of the head wheel. Via a limiting resistor 14, an alternating voltage source 15 supplies conductors 12 and 13 with an alternating current I1. Conductors 12 and 13 have an elongate shape. The direction of arrow 25 indicates the direction of the current. Current I1 flows through conductor 12 in the direction leading into the plane of the drawing and then through conductor 13 in the direction leading out of the plane of the drawing. Current I1 flows through the two conductors 12, 13 in opposite directions, i.e. in opposite polarity, so that a magnetic field of a minimum field intensity builds up around the two conductors. A head position circuit 16 separates pulses from the signals coming from magnetic heads 2 and 3. These pulses are induced by conductors 12 and 13. The pulses are forwarded by head position circuit 16 through line 17 to control 9. Control 9 compares the sync words coming from sync separation stage 8 with the head position pulses and regulates head wheel control 11 based on the sync words and the pulses in a known manner.

In FIG. 2 the two elongate conductors 12 and 13 are fixed in head wheel 1 parallel to the axis of rotation thereof. Conductors 12 and 13 are supplied with a current I2 from alternating voltage source 15 via a limiting resistor 14. Conductors 12 and 13 are connected with voltage source 15 and limiting resistor 14 by way of slip rings 19 and 20 and contact brushes. Advantageously, magnetic heads 2 and 3 and conductors 12 and 13 are arranged in two planes on head wheel 1 so that conductors 12 and 13 do not influence magnetic tape 4. During rotation of head wheel 1, conductors 12 and 13 induce a voltage in a magnetic head 18. This voltage is fed via line 17 to control 9 and compared with the synch words as in FIG. 1 for regulating head wheel control 11.

Figure 3:
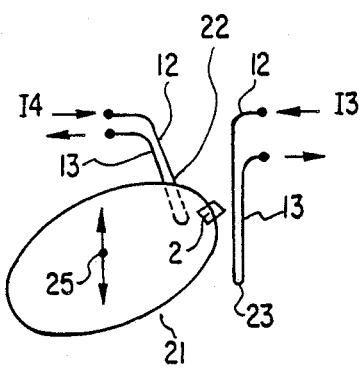
FIG. 3 is a schematic representation of two signal emitters at a head wheel disk according to a further embodiment of the invention.

FIG. 3 shows a magnetic head 2 on a head wheel path 21. Magnetic head 2 rotates on head wheel path 21 and is displaceable in the direction of the axis of rotation 25. Two conductor loops 22 and 23 are disposed at head wheel path 21. Each one of the two conductor loops 22, 23 is composed of two current carrying conductors 12 and 13. Conductor loop 23 is disposed parallel to axis of rotation 25. Conductor loop 22 extends over the lifting range of head wheel path 21. Conductor loop 22 forms an acute angle, or better a V-shaped arrangement, with conductor loop 23. Conductor loop 22 is arranged so that it is able to induce a voltage in magnetic head 2 over the entire lifting range of head wheel path 21. The precise position of head 2 can be determined by way of conductor loop 23. The frequency of the induced pulses can be used to determine the velocity of magnetic head 2. Due to the oblique position of conductor loop 22 with respect to conductor loop 23, different distances are given between conductor loops 22 and 23 depending on the displacement of head 2 in the direction of axis 25. Thus, these different distances between conductor loops 22, 23, correspond to the displacement in height of the head wheel path in the direction of axis of rotation 25 which can be calculated over the lifting range. The lifting range serves the purpose of sequentially scanning a plurality of parallel longitudinal tracks arranged in blocks on a magnetic tape as will be appreciated by those skilled in the art. This scanning takes place over a defined height, i.e. the width of the magnetic tape.

Figure 4:
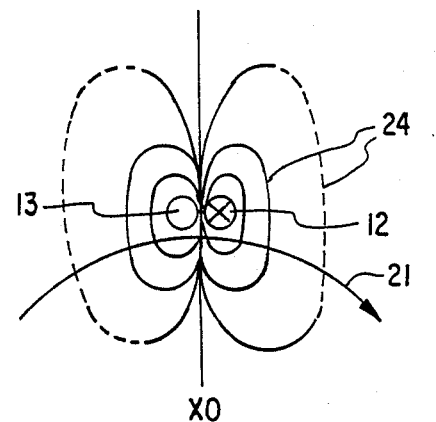
FIG. 4 is a diagram which shows the magnetic field of a signal emitter.

FIG. 4 shows two current carrying conductors 12 and 13 which build up an magnetic field having field lines 24. The two electrical conductors 12 and 13 are disposed at a head wheel path 21. After mathematically forming the quadrature or the sum, which corresponds to electrical rectification, this electrical field is a minimum at location X0. See in this connection G. Joos, *Lehrbuch der theoretischen Physik* [Textbook of Theoretical Physics], Eighth Edition, Leipzig 1954, published by Akademische Verlagsgesellschaft Geest & Portig K.-G, at page 280, Equation (4).

Figure 5:
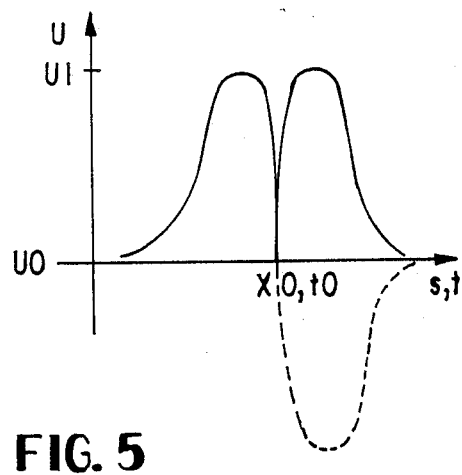
FIG. 5 is a diagram which shows a voltage induced by a signal emitter in a magnetic head.

FIG. 5 shows an induced voltage U after rectification. This voltage was induced in a magnetic head on head wheel path 21 at point X0 in the magnetic head. It is also possible to observe this with a time abscissa and a point in time t0. The difference in voltage between U1 and U0 in the vicinity of location X0 permits a precise determination of the phase, or better the angular position of heads 2, 3 or of the head position on a head wheel path 21. In the vicinity of X0, the magnetic field has a strong gradient. The induced voltage changes its sign at point X0. For good transmission, the frequency of the change in polarity of currents I1 to I4 should be selected to be approximately the resonant frequency of a head/transmission system. That means, that frequency should be selected at which the system composed of head, equalizer and amplifier reacts with the greatest sensitivity.

Figure 6:
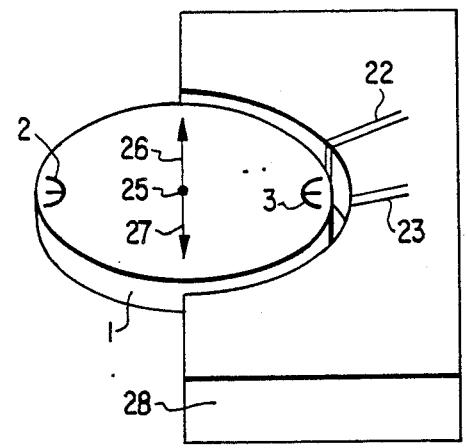
FIG. 6 is a schematic showing a signal emitter in the vicinity of a head wheel according to the invention.

FIG. 6 shows a head wheel 1 with two magnetic heads 2 and 3, mounted in the direction of axis of rotation 25 so as to be movable in both directions 26 and 27. To characterize the respective positions of head wheel 1 relative to its environment, the two conductor loops 22 and 23 are fixed to the chassis 28 of a video recorder in the vicinity of head wheel 1.

Figure 7:
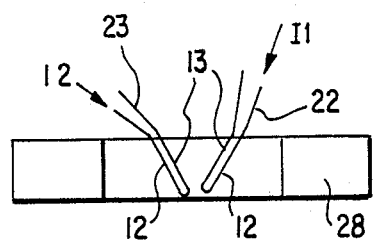
FIG. 7 is a schematic which shows a V-shaped arrangement including two conductor loops which can be used in FIG. 6.

FIG. 7 shows a side view of a chassis 28 in the vicinity of head wheel 1 and two conductor loops 22 and 23. Each conductor loop 22 and 23 is provided with conductors 12 and 13. Conductor loop 22 carries current I1, conductor loop 23 carries current I2.

Figure 8:
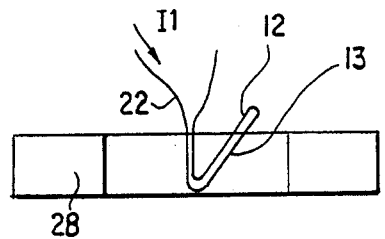
FIG. 8 is a schematic which shows a V-shaped arrangement including one conductor loop which can be used in FIG. 6.

FIG. 8 shows a V-shaped arrangement including a single conductor loop 22. Each conductor 12 and 13 of loop 22 forms a V-shaped arrangement. Only a single conductor loop 22 through which flows a current I1 is required for this V-shaped arrangement.

FIG. 9 shows a plurality of conductors 12 and 13 in a coil-shaped arrangement.

Figure 10:
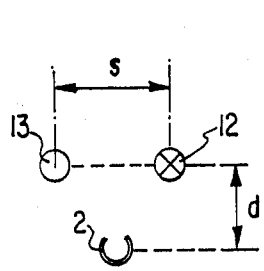
FIG. 10 is a diagram showing dimensional relationships of the conductor used for the pickup according to the invention.

FIG. 10 shows conductors 12 and 13 wherein a distance s between the two conductors is on the order of magnitude of a distance d between each one of conductors 12 and 13 and heads 2, 3. Distances s and d are small compared to the length of the circumference of the head wheel path. In the ideal case, distance s between the two conductors equals zero.

It will be understood that the above description of the present invention is susceptible to various modifications, changes and adaptations, and the same are intended to be comprehended within the meaning and range of equivalents of the appended claims.

What is claimed is:

1. In a device for transferring signals between itself and a record carrier tape, including a rotating head wheel disk having an axis of rotation and mounted for movement along said axis, and at least one head disposed on said rotating head wheel disk for cooperating with a record carrier tape; the improvement comprising
    means for detecting the angular position and the linear position along said axis of said head wheel disk during rotation thereof, said means for detecting comprising sensor means disposed on said rotating head wheel disk, and signal emitter means for producing signals in said sensor means indicating the angular position and the linear position along said axis of rotation of the head wheel disk, with said signal emitter means including:
    a first elongated conductor loop positioned adjacent said head wheel disk with the elongate axis of said loop oriented generally parallel to said axis of rotation,
    a second elongated conductor loop positioned adjacent said head wheel disk with the elongate axis of said second loop forming an acute angle with the elongate axis of said first loop, and such that said sensor means passes said first and second conductor loops successively during rotation of said head wheel disk, and
    means for producing a current in each of said first and second loops, whereby the signal produced in said sensor means by one of said loops is an indication of the angular position, and the relative time between the signals produced in said sensor means by said first and second loops is an indication of the linear position of said head wheel disk.

2. A device as defined in claim 1, wherein said conductors are parallel to one another, whereby the associated said current flows in opposite directions in said conductors of each said pair.

3. A device as defined in claim 2 wherein said conductors of each pair are positioned so that said sensor means successively passes same during rotation of said head wheel disk.

4. Device as defined in claim 1, wherein said device is a video recorder and the tape is a magnetic tape.

5. Device as defined in claim 1, wherein said current flowing through said loops forms a magnetic field around each of said loops.

6. A device as defined in claim 1 wherein said first and second conductor loops extend substantially over the full length of axial movement of said head wheel disk.

7. A device as defined in claim 1 wherein said device is a magnetic video tape recorder, and said sensor means comprises said at least one head.

8. A device for detecting the angular position and axial linear position of a rotatable head wheel disk of a video tape recorder head wheel disk which is linearly displaceable along its axis of rotation, comprising:
    a field producing means positioned adjacent the circumferential edge of said head wheel disk and including a first elongated portion having its elongate axis oriented generally parallel to said axis of rotation, and a second elongated portion having its elongate axis oriented generally at an acute angle with respect to said elongate axis of said first portion of said field producing means; and a sensor means, mounted on said head wheel disk so that said sensor means passes said first and second field producing means sequentially during rotation of said head wheel disk, for detecting fields produced by said first and second portions of said field producing means during rotation and for providing first and second output signals, respectively, whereby one of said first and second signals is an indication of the angular position of said head wheel disk and the time between said first and second signals is an indication of the linear position of said head wheel disk along said axis of rotation.

9. A device as defined in claim 8 wherein said first and second portions of said field producing means each extend substantially the full length of possible axial travel of said disk.

10. A device as defined in claim 8 wherein each of said first and second portions of said field producing means comprises a respective elongated conductor loop having a current flowing therein.

11. A device as defined in claim 8 wherein said field producing means comprises a single conductor loop which has a current flowing therein and which is V-shaped to provide said first and second portions.

12. A device as defined in claim 8 wherein said field producing means includes at least one elongated conductor loop formed of at least two substantially parallel conductors through which a current flows and which are positioned so that said sensor means successively passes said two parallel conductors during rotation of said head wheel disk.

* * * * *

UNITED STATES PATENT AND TRADEMARK OFFICE
CERTIFICATE OF CORRECTION

PATENT NO.   : 4,930,025
DATED        : May 29th, 1990
INVENTOR(S)  : Gunter Oberjatzas; Heinz-Werner Keesen It is certified that error appears in the above-identified patent and that said Letters Patent is hereby corrected as shown below:

In the heading of the patent under [63] change "019,079" to --019,019--.

Signed and Sealed this

First Day of October, 1991

Attest:

Attesting Officer

HARRY F. MANBECK, JR.

Commissioner of Patents and Trademarks